United States Patent [19]

Daly

[11] 4,061,173
[45] Dec. 6, 1977

[54] TIRE SERVICING APPARATUS

[75] Inventor: Robert V. Daly, West Hollywood, Calif.

[73] Assignee: The Coats Company, Inc., La Vergne, Tenn.

[21] Appl. No.: 755,185

[22] Filed: Dec. 29, 1976

[51] Int. Cl.² .............................................. B60C 25/12
[52] U.S. Cl. .................... 157/1.17; 157/1.24
[58] Field of Search ................ 144/288 A; 157/1.1, 157/1.24, 1.17

[56] References Cited

U.S. PATENT DOCUMENTS

| 3,780,785 | 12/1973 | Schultz et al. | 157/1.24 |
| 3,785,424 | 1/1974 | ishovd | 157/1.1 |
| 3,805,871 | 4/1974 | Corless | 157/1.1 |
| 3,818,968 | 6/1974 | Hogg | 157/1.24 |
| 3,891,019 | 6/1975 | Holladay | 157/1.24 |

Primary Examiner—Al Lawrence Smith
Assistant Examiner—James G. Smith
Attorney, Agent, or Firm—Wegner, Stellman, McCord, Wiles & Wood

[57] ABSTRACT

A tire changer with bead seating apparatus including a base, a wheel support including clamps movable between wheel rim gripping and non-wheel engaging positions, a shaft rotatably journalled on the base and mounting the wheel support for rotation on the base, a device for rotating the shaft and thus the wheel support, a plurality of nozzles, one for each of the clamps, mounted on the associated clamp for movement therewith, and an air passage including a conduit in the shaft for directing air under pressure to the nozzles.

6 Claims, 3 Drawing Figures

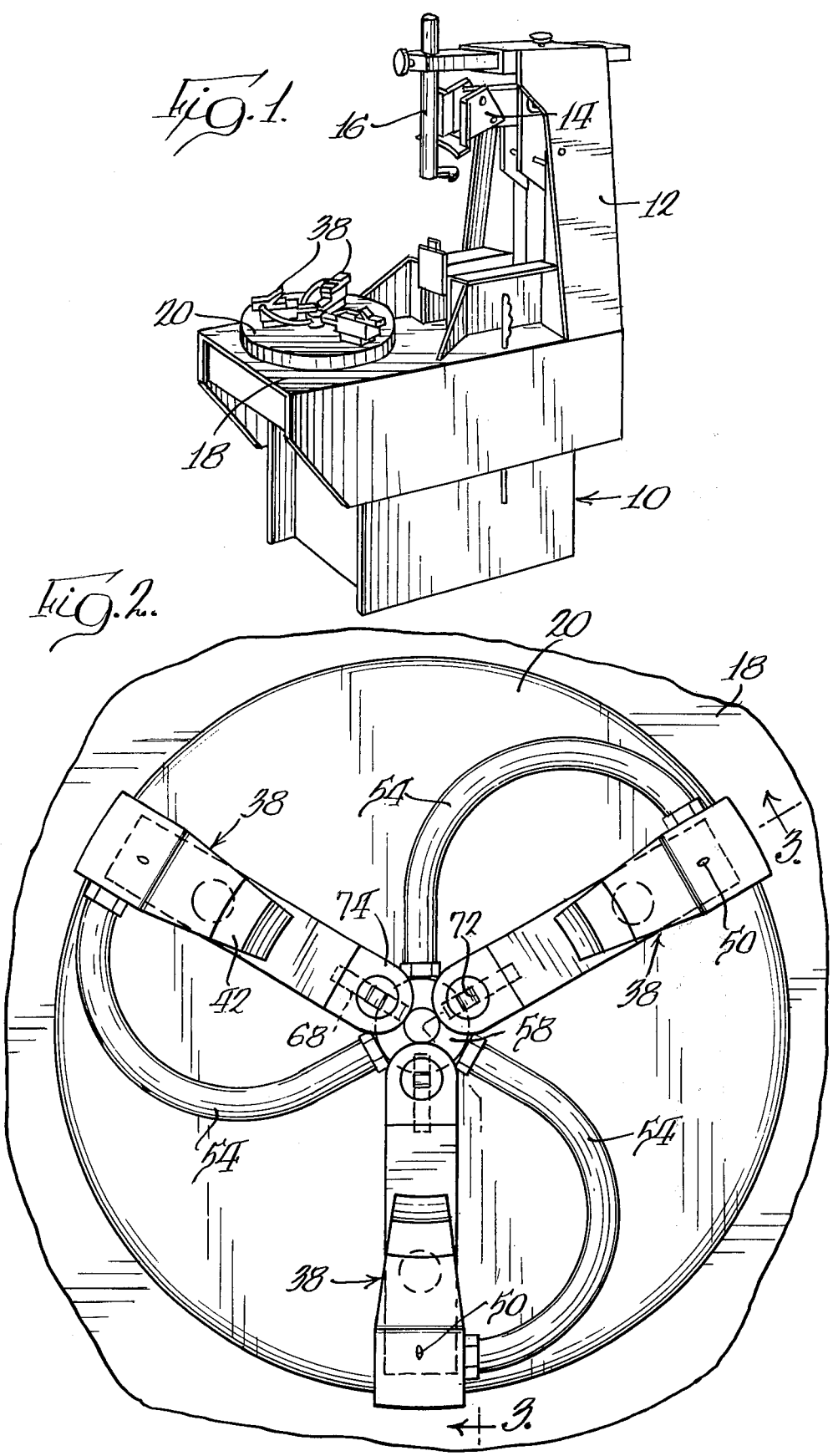

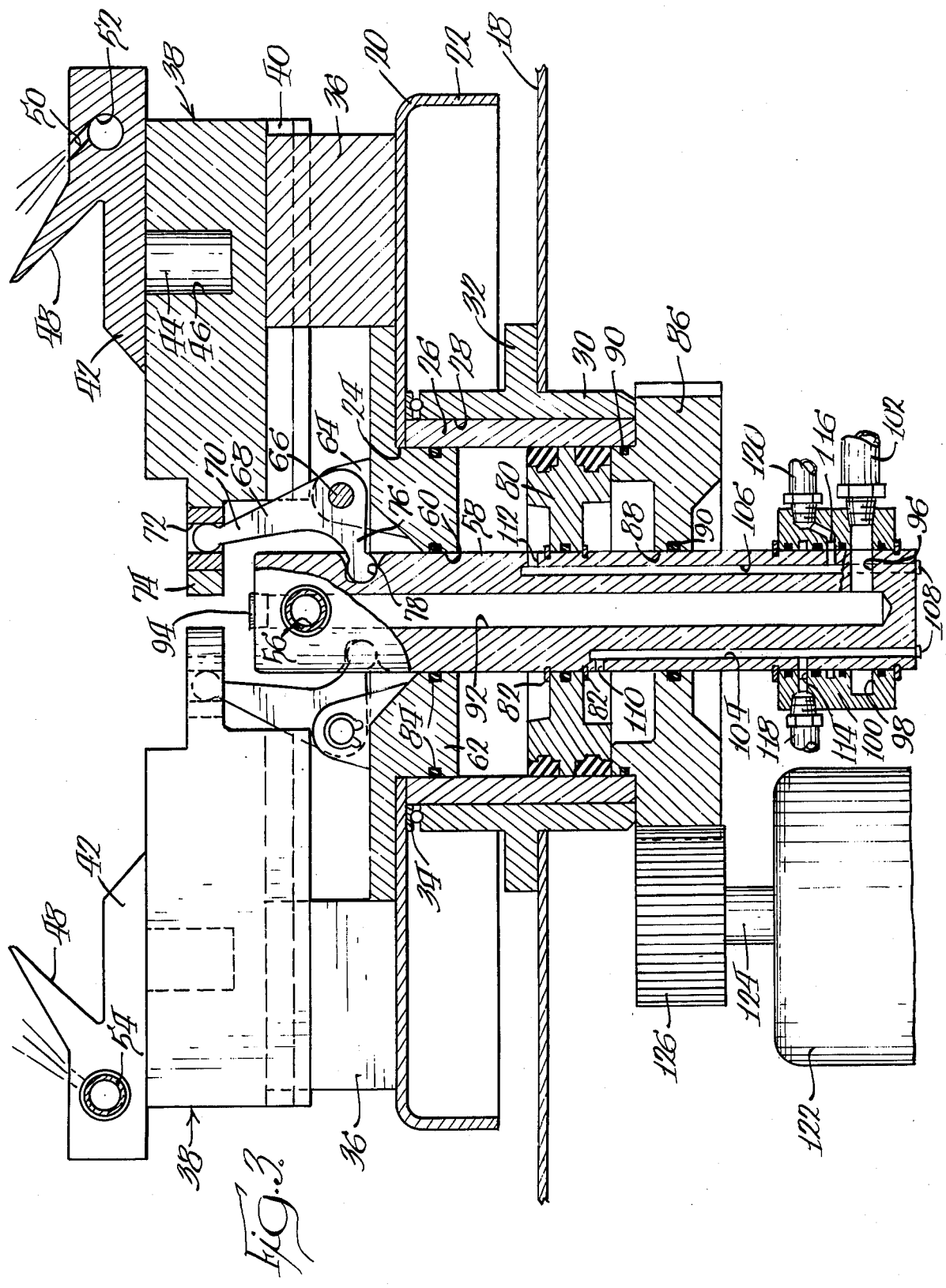

TIRE SERVICING APPARATUS

BACKGROUND OF THE INVENTION

This invention relates to tire changing apparatus equipped with tire bead seating means, and more particularly, to a tire changer of the type having a rotatable wheel support.

A variety of tire changing apparatus presently available may include means for seating beads of a tire on a wheel while the wheel is received on the tire changer. In the case of tire changers of the type having a stationary wheel supporting table and a rotatable center post, the bead seating apparatus will typically be in the form of a plurality of jets at differing locations on the tire changer which direct air to the interface of the wheel rim and the tire thereon to cause a pressure differential to come into existence so that the bead sealingly engages the rim. Such apparatus have worked well for their intended purpose.

In tire changers of the type wherein the wheel is received on a rotatable table, the bead seating apparatus will generally be in either of two forms. In one case, a plurality of nozzles may be employed at fixed locations or, a structure having one or more nozzles may be brought into engagement with the wheel and/or tire. Neither form has operated as efficiently as might be desired. In the case of the form wherein nozzles are located at fixed locations, some difficulty may be experienced in reliably seating the beads on a wide variety of wheel sizes since the angle of attack of the air stream cannot be optimized for all wheel sizes due to the fixed location of the nozzles.

In the case of changers wherein a structure having one or more nozzles is applied to the tire, a physical act is required on the part of the operator of the tire changer which requires time to perform and thereby lessens the efficiency of the overall tire changing operation.

SUMMARY OF THE INVENTION

It is the principal object of the invention to provide a new and improved tire changer of the type having a rotary wheel support coupled with bead seating apparatus. More specifically, it is an object of the invention to provide such a tire changer with bead seating apparatus wherein optimal air flow characteristics are attained on all of a wide variety of the tire sizes and wherein the operator of the tire changer is not required to manually place the bead seating apparatus at a predetermined position with respect to a wheel on the tire changer.

An exemplary embodiment of the invention achieves the foregoing objects in a tire changer including a base, a wheel support having clamps movable between the rim gripping and non-wheel engaging positions, and a shaft rotatably journalled in the base and mounting the wheel support for rotation on the base. Means are provided for rotating the shaft and a plurality of nozzles, one for at least some of the clamps, are mounted on the associated clamps for movement therewith. Means are provided which include a conduit in the shaft, for directing air under pressure to the nozzles. Because the nozzles move with the clamps, they will always be directed at the rim-tire interface at an optimal angle regardless of wheel size, and do not require manual placement.

A preferred embodiment of the invention contemplates the clamps including a clamp body having a notch opening in a side thereof towards the shaft. The nozzles comprise upwardly and inwardly directed ports in the bodies on the side of the notches remote from the shaft.

The invention contemplates that the air directing means include flexible conduits extending from the shaft and in fluid communication with the conduit in the shaft. The conduits extend from the shaft to the nozzles.

A rotary union is disposed about part of the shaft and in fluid communication with the conduit therein. A supply of air under pressure may be connected to the rotary union.

A highly preferred embodiment of the invention contemplates that the shaft be mounted for reciprocation along its axis and there be provided means for reciprocating the shaft. Means are provided which interconnect the shaft and the clamps for moving the clamps between the positions in response to reciprocation of the shaft.

In a highly preferred embodiment, the means for reciprocating the shaft includes a piston carried by the shaft and a cylinder receiving the piston and restrained against reciprocating movement. The shaft includes additional conduits opening to the cylinder on opposite sides of the piston to provide a double-acting cylinder for reciprocating the shaft.

Other objects and advantages will become apparent from the following specification taken in connection with the accompanying drawings.

DESCRIPTION OF THE DRAWINGS

FIG. 1 is a perspective view of a tire changer made according to the invention;

FIG. 2 is an enlarged, plan view of the wheel supporting table of the tire changer; and FIG. 3 is a vertical section taken along approximately the line 3—3 of FIG. 2.

DESCRIPTION OF THE PREFERRED EMBODIMENT

An exemplary embodiment of a tire changer made according to the invention is illustrated in FIG. 1 and is seen to include a base, generally designated 10, having an upright pillar 12 on one side thereof. The pillar 12 may support and house a conventional bead breaker 14 and may mount, for both vertical and horizontal movement, a tire changing tool 16, also of conventional construction.

Mounted on the upper surface 18 of the base 10 is a rotatable wheel support table 20 made according to the invention. Those skilled in the art will recognize that, after the bead on a tire has been broken through use of the bead breaker 14, the wheel with the tire thereon will be secrured to the table 20 and the tool 16 brought into operative relation with respect thereto. The table 20 will then be rotated to demount the tire from the wheel. A new tire will then be placed on the wheel and, using the tool 16, the table 20 will again be rotated to mount the tire on the wheel. Thereafter, the beads will be set by apparatus to be described hereinafter.

Referring now to FIGS. 2 and 3, the nature of the table 20 and the bead seating apparatus will be described in greater detail. The table 20, as seen in FIG. 3, comprises an inverted, stamped, disc-like plate 22 having a central opening 24. The table 20, about the opening 24, is secured by any suitable means to a sleeve 26 which is rotatably received in the central opening 28 of a casting 30 having an annular, radially outwardly extending flange 32 which is secured to the top 18 of the base 10. A thrust bearing 34 may be interposed between the upper end of the casting 30 and the underside of the table 20.

At equally angularly spaced locations, three guide blocks 36 are secured by any suitable means to the upper surface of the table 20 and the blocks, mount for reciprocation, clamps, generally designated 38. The undersides of the clamps 38 include T-shaped grooves 40 and the guide blocks 36 have complementary T-shaped projections (not shown) on their upper ends which are received in the slots 40 so as to allow the clamps 38 to reciprocate but not otherwise be displaced from the guide blocks 36.

Each of the clamps 38 includes a clamp body 42. Each clamp body 42 includes a downwardly extending stub shaft 44 which may be received in a bore 46 in the clamp 38. In general, a plurality (not shown) of the bores 46 will be provided so as to allow adjustment of the radial position of the clamp body 42 with respect to the main portion of the clamps 38. Each of the clamp bodies 42 includes a notch 48 which opens inwardly toward the center of the table 20 and which is adapted to have its opposite sides embrace the rim of a wheel placed on the table to clamp the same in place. Each clamp body 42 further includes an upwardly and radially inwardly directed port or passage 50 which serves as a nozzle for directing air under pressure toward the interface of a wheel and a tire bead when the wheel is clamped on the table. Each of the ports 50 is in fluid communication with a bore 52 extending to one side of the bodies 42 for receipt of a flexible conduit 54, as best seen in FIG. 2.

The ends of each of the conduits 54 opposite from the clamp bodies 42 are received in radially extending ports 56 (FIG. 3), only one of which is shown, in the upper end of shaft 58. The shaft 58 extends generally vertically downwardly through an opening 60 in a plate 62 disposed on the top of the table 20 and extending down into the interior of the sleeve 26. The plate 62, on its upper surface, about the opening 60, mounts three upwardly directed tongues 64, each of which pivots by means of pivot pins 66, corresponding bell crank 68. The upwardly directed arms 70 of each bell crank are received in apertures 72 in radially inwardly directed tabs 74 on each of the clamps 38, while the generally horizontally extending arms 76 of each bell crank 68 are received in radially outwardly opening recesses 78 in the shaft 58.

As a consequence of this relationship, upward movement of the shaft 58 within the bore 60 and the plate 62 will cause the clamps 38 to be directed radially outwardly to a position wherein they would not engage the rim of a wheel. Conversely, downward movement of the shaft 58 will cause the clamps 38 to move radially inwardly so that the rim of a wheel received on the table 20 would be tightly embraced by opposite sides of the notches 48 to be clamped in place.

The tire changer includes structure for reciprocating the shaft 58. In particular, a piston 80 is mounted on the shaft 58 for movement therewith and is held in place by retaining rings 82. The interior of the sleeve 26 serves as the cylindrical wall of a fluid cylinder and the piston 80 sealingly engages the same. The plate 62 serves as one end of the cylinder and appropriate seals 84 are employed to prevent leakage.

The opposite end of the cylinder is defined by a gear 86 which is connected, by any suitable means, to the sleeve 20 for rotation therewith. The gear includes a central opening 88 through which the shaft 58 passes and, again, suitable seals 90 are provided as indicated to prevent leakage.

Returning to the shaft 58, the same includes a central conduit 92 formed by a bore or the like and plugged as at 94 at its upper end. The ports 56, which receive the flexible conduits 54, are in fluid communication with the interior of the bore 92. At the opposite end of the shaft 58 from the ports 56, the shaft 58 is provided with a radially extending port 96 which is in fluid communication with an annulus 98 on the interior of a rotary coupling or union 100. An air supply hose 102 is in fluid communication with the annulus 98 so that air pressure from a source, through suitable valving, will untimately be directed to the nozzles 50 to impinge upon the rim bead interface of a wheel and tire clamped on the table to seat the beads thereof. The shaft 58 includes additional, axial conduits 104 and 106, both of which are capped as at 108.

The conduit 104 includes a radially extending port 110 which opens to the exterior of the shaft 58 on the underside of the piston 80, while the conduit 106 includes a similar port 112 which opens to the upper side of the piston 80. The conduit 104 also opens to an annulus 114 in the union 100, while the conduit 106 opens to a similar annulus 116. Suitably valved fluid hoses 118 and 120 are in fluid communication with the annuluses 114 and 116 respectively, so that by applying air under pressure to either, the piston 80 may be reciprocated within the sleeve 28 to cause the aforementioned reciprocation of the shaft 58 and the resulting clamping or unclamping action.

By reason of the journalling of the sleeve 26 in the base 10, it will also be appreciated that the shaft 58 is also journalled in the base. To drive the table 20 in a rotary direction, a motor 122 is provided and has a rotary output shaft 124 bearing a gear 126 which is in engagement with the gear 86. Thus, the table 20 may be rotated for tire mounting and demounting operations, as mentioned previously.

Provision of the rotary union 100 allows air to be directed to the cylinder defined by the sleeve 26 as well as the nozzles 50 for all positions of rotation of the table 20 relative to the base.

It will also be appreciated that by reason of the location of the nozzles 50 and the clamps 38, the position of the nozzles 50 will automatically be adjusted for optimum performance on varying size wheels when the clamps 38 are brought into clamping engagement with the rim of a wheel placed on the table 20. Thus, optimum performance can be experienced over a wide range of varying wheel sizes and there is no need for the operator to manually locate the nozzles with respect to the wheel as in the case of many rotary tabletop type tire changers.

I claim:

1. In a tire servicing apparatus the combination of:
   a base;
   a wheel support including clamps movable between wheel rim gripping and non-wheel engaging positions;
   a shaft rotatably journalled on said base and mounting said wheel support for rotation on said base;
   means for rotating said shaft;
   a plurality of nozzles, one for at least some of said clamps, mounted on the associated clamp for movement therewith; and means, including a conduit in said shaft, for directing air under pressure to said nozzles.

2. The tire servicing apparatus of claim 1 wherein said shaft is mounted for reciprocation along its axis; means for reciprocating said shaft; and means interconnecting said shaft and said clamps for moving said clamps between said positions.

3. The tire servicing apparatus of claim 2 wherein said reciprocating means includes a piston carried by said shaft and a cylinder receiving said piston and restrained against reciprocating movement; and said shaft includes additional conduits opening to said cylinder on opposite sides of said piston; all of said conduits further opening to a surface of said shaft remote from said wheel support; and a rotary union about said surface and including fluid inlet ports for each of said conduits.

4. The tire servicing apparatus of claim 1 wherein each of said clamps comprises a clamp body having a notch opening to a side thereof toward said shaft; and said nozzles comprise upwardly and inwardly directed ports in said bodies on the side of the notches remote from the shaft.

5. The tire servicing apparatus of claim 4 wherein said directing means includes flexible conduits extending from said shaft and in fluid communication with the conduit therein, to said nozzles.

6. The tire servicing apparatus of claim 5 wherein said directing means further includes a rotary union about a portion of said shaft and in fluid communication with the conduit therein.

* * * * *